(12) United States Patent
de Frutos

(10) Patent No.: US 8,134,329 B2
(45) Date of Patent: Mar. 13, 2012

(54) BUCK CONVERTER WITH IMPROVED FILTER DESIGN

(75) Inventor: Xavier de Frutos, Aix en Provence (FR)

(73) Assignee: International Rectifier Corporation, El Segundo, CA (US)

( * ) Notice: Subject to any disclaimer, the term of this patent is extended or adjusted under 35 U.S.C. 154(b) by 489 days.

(21) Appl. No.: 11/735,035

(22) Filed: Apr. 13, 2007

(65) Prior Publication Data

US 2009/0060479 A1 Mar. 5, 2009

Related U.S. Application Data

(60) Provisional application No. 60/791,922, filed on Apr. 13, 2006.

(51) Int. Cl.
*H02P 27/04* (2006.01)

(52) U.S. Cl. ........ 318/800; 318/599; 318/811; 323/259; 323/344

(58) Field of Classification Search ............. 318/400.01, 318/152, 400.09, 400.26, 400.27, 400.29, 318/400.3, 430, 432, 756, 779, 794, 795, 318/800, 810, 599, 811; 323/259, 344, 260, 323/242, 271; 363/26, 34, 41, 45; 388/819, 388/908
See application file for complete search history.

(56) References Cited

U.S. PATENT DOCUMENTS

| | | | | |
|---|---|---|---|---|
| 4,734,626 A * | 3/1988 | Sutrina et al. | ............ | 318/76 |
| 4,743,812 A * | 5/1988 | Dishner | ............ | 318/14 |
| 4,801,859 A * | 1/1989 | Dishner | ............ | 323/224 |
| 5,235,504 A * | 8/1993 | Sood | ............ | 363/53 |
| 5,742,142 A * | 4/1998 | Witt | ............ | 318/599 |
| 5,786,992 A * | 7/1998 | Vinciarelli et al. | ............ | 363/89 |
| 5,818,214 A * | 10/1998 | Pelly et al. | ............ | 323/351 |
| 5,838,144 A * | 11/1998 | Wills et al. | ............ | 323/238 |
| 5,898,581 A * | 4/1999 | Liu | ............ | 363/53 |
| 5,929,690 A * | 7/1999 | Williams | ............ | 327/374 |
| 5,982,156 A * | 11/1999 | Weimer et al. | ............ | 323/222 |
| 6,166,500 A * | 12/2000 | Makaran | ............ | 318/400.22 |
| 6,969,922 B2 * | 11/2005 | Welches et al. | ............ | 290/1 A |
| 6,987,242 B2 * | 1/2006 | Geissler | ............ | 219/130.1 |
| 7,271,564 B2 * | 9/2007 | Ramu | ............ | 318/254.1 |
| 7,274,116 B2 * | 9/2007 | Inoue et al. | ............ | 307/100 |
| 7,542,257 B2 * | 6/2009 | McCormick et al. | ............ | 361/91.1 |
| 7,781,943 B1 * | 8/2010 | Hamel et al. | ............ | 310/339 |
| 7,852,038 B2 * | 12/2010 | Ramu | ............ | 318/701 |
| 2006/0267527 A1 * | 11/2006 | Khopkar et al. | ............ | 318/254 |
| 2007/0120539 A1 * | 5/2007 | Bray et al. | ............ | 322/59 |

OTHER PUBLICATIONS

Chapman, Stephen J., Electric Machinery Fundamentals, 1991, 1985 by McGraw-Hill, Second Edition, p. 156.*
Floyd, Thomas L., Electronic Devices, 1996, Prentice-Hall Inc., Fourth Edition, p. 452.*

\* cited by examiner

*Primary Examiner* — Walter Benson
*Assistant Examiner* — Antony M Paul
(74) *Attorney, Agent, or Firm* — Farjami & Farjami LLP

(57) ABSTRACT

A buck converter for use in controlling a motor in accordance with an embodiment of the present invention includes a power input operable for connection to a DC power supply, a switch for selectively connecting the motor to the power supply, a pulse width modulation controller operable to provide a pulse width modulation signal to the switch, wherein the switch connects the motor to the power supply based on the pulse width modulation signal, and a voltage shifting capacitor connected across the switch and in series with a diode. The buck converter may include a shift control device operable to control a voltage across the voltage shifting capacitor.

20 Claims, 8 Drawing Sheets

(ON State)

(ON State)

(OFF State)

(ON State)

(OFF State)

|←ON State→|←OFF State→|

BUCK CONVERTER WITH IMPROVED FILTER DESIGN

CROSS REFERENCE TO RELATED APPLICATIONS

The present application claims benefit of and priority to U.S. Provisional Patent Application No. 60/791,922, entitled INPUT FILTER TOPOLOGY FOR BUCK CONVERTER THAT TAKES ADVANTAGE OF THE LOAD INDUCTANCE, filed Apr. 13, 2006, the entire contents of which are hereby incorporated by reference herein.

BACKGROUND OF THE INVENTION

The present invention relates to a buck converter for use with a DC brushed motor to provide variable speed motor control. More specifically, the present application relates to a PWM buck converter that eliminates the need for a bulky input filter.

FIGS. 1A and 1B, respectively, illustrate a schematic representation of a buck converter 1 for use in controlling a brushed DC motor M. In FIG. 1A, the motor M is ON (ON state). That is, the motor M is connected to the DC line via the switch SW1. In FIG. 1B, the motor M is OFF (OFF state). That is, the switch SW1 is open such that the motor is not connected to the DC line. A conventional buck converter such as converter 1 utilizes an input filter 2 in order to meet EMI requirements for a power generator. The filter 2 is sized to limit the ripple of the DC line current to an acceptable value. Typically, the filter 2 includes an inductor L and two capacitors C1, C2, for example, as illustrated in FIGS. 1A and 1B. The capacitors C1 and C2 are typically rather expensive and typically are large reservoir capacitors. Thus, the filter 2 tends to be relatively bulky and expensive.

Accordingly, it would be beneficial to provide a buck converter for controlling a motor that avoids the problems mentioned above.

SUMMARY OF THE INVENTION

It is an object of the present invention to provide a buck converter that avoids excessive EMI without the need for a bulky and expensive input filter.

A buck converter for use in controlling a motor in accordance with an embodiment of the present invention includes a power input operable for connection to a DC power supply, a switch for selectively connecting the motor to the power supply, a pulse width modulation control operable to provide a pulse width modulation signal to the switch, wherein the switch connects the motor to the power supply based on the pulse width modulation signal and a voltage shifting capacitor connected across the switch and in series with a diode.

A buck converter for use in controlling a motor in accordance with an embodiment of the present application includes a power input operable for connection to a DC power supply, a switch for selectively connecting the motor to the power supply, a pulse width modulation control operable to provide a pulse width modulation signal to the switch, wherein the switch connects the motor to the power supply based on the pulse width modulation signal and a voltage shifting capacitor connected across the switch and in series with a diode to provide input filtering when the motor is not connected to the power supply by the switch.

A buck converter for use in controlling a motor in accordance with an embodiment of the present invention includes a power input operable for connection to a DC power supply, a switch for selectively connecting the motor to the power supply, a pulse width modulation control operable to provide a pulse width modulation signal to the switch, wherein the switch connects the motor to the power supply based on the pulse width modulation signal and a voltage shifting capacitor connected across the switch and in series with a diode such that current flows through the motor when the motor is not connected to the power supply by the switch.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

Figure 1A:
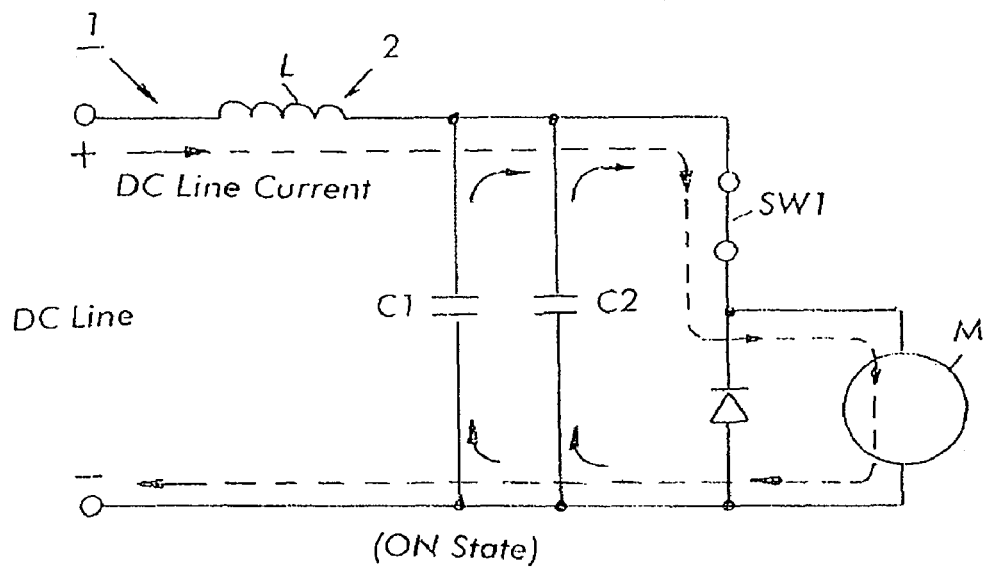
FIG. 1A is an illustration of a buck converter in an ON state.
Figure 1B:
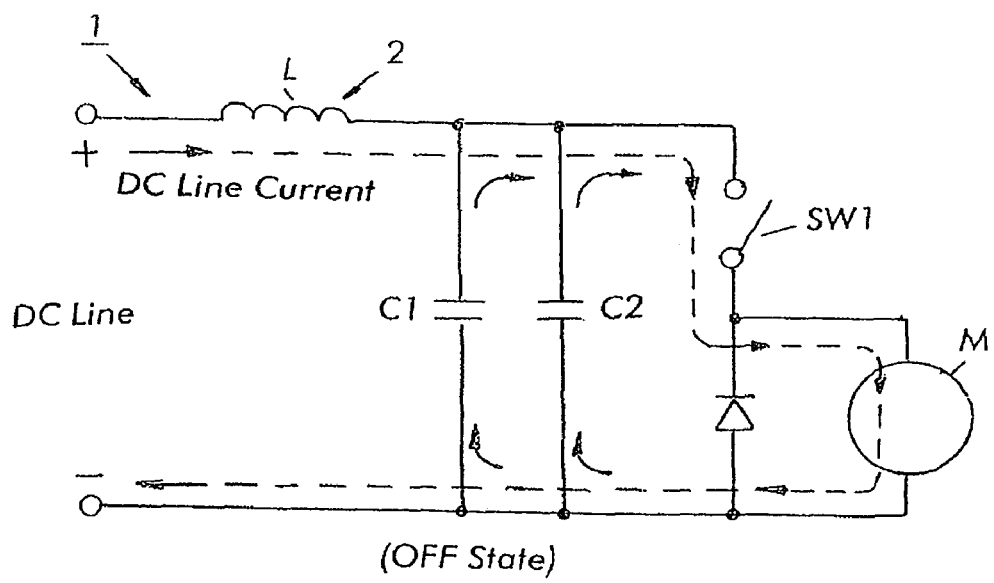
FIG. 1B is an illustration of a buck converter in an OFF state.

In order to avoid the bulk and expense of the reservoir capacitors C1, C2 of FIGS. 1A and 1B, for example, the present invention takes advantage the LC filter-like nature of the motor M, itself. If the input filter 2, for example, formed by the inductor L and capacitors C1, C2 in FIGS. 1A and 1B were simply removed, the DC line current will have a noisy pulse waveform, which is undesirable.

Figure 2A:
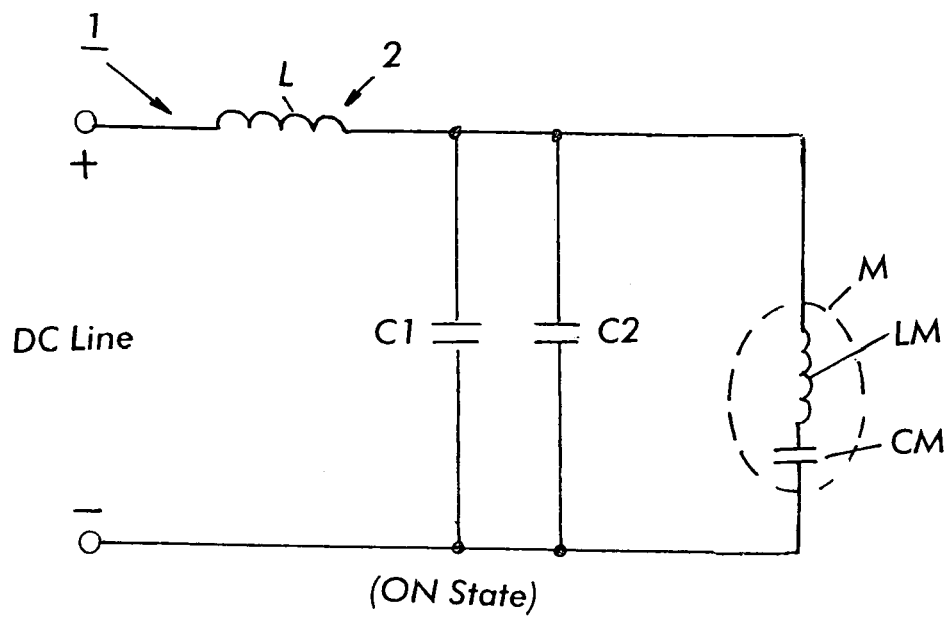
FIG. 2A is an illustration of a buck converter in an ON state with the motor represented in a modified manner.
Figure 2B:
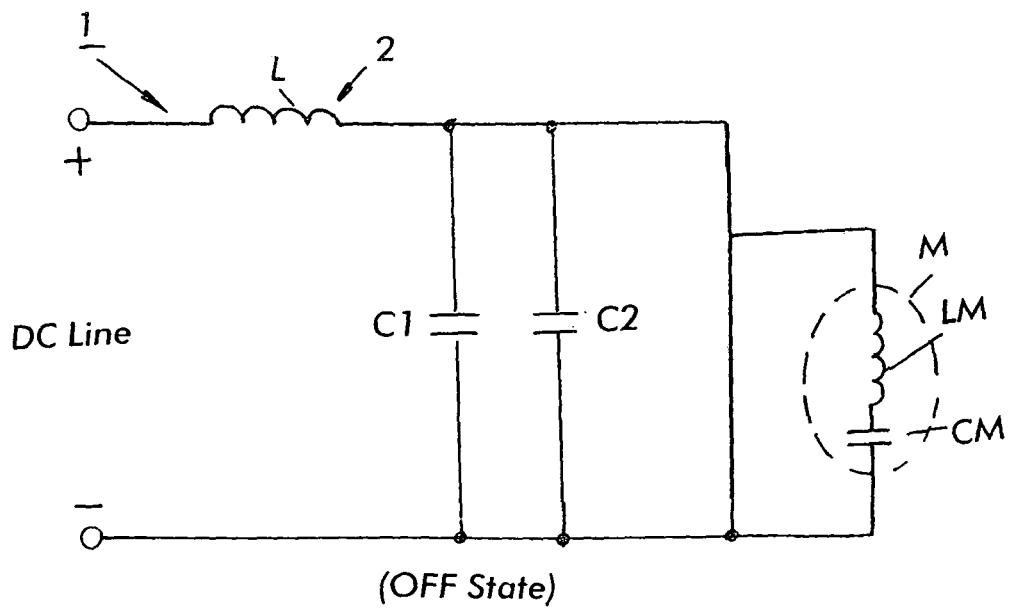
FIG. 2B is an illustration of a buck converter in an OFF state with the motor represented in a modified manner.

FIGS. 2A and 2B are similar to FIGS. 1A and 1B discussed above except that the motor M is represented in a modified form. In particular, the motor M is represented by its inductance LM and its capacitance CM. Thus, the motor M, itself, may be considered an LC filter. Due to the inductance LM of the motor M, the motor current is almost continuous, that is, substantially smooth and constant. However, when the motor is off (OFF State), that is, when the switch SW1 is open and the motor M is not connected to the DC line, as illustrated in FIG. 2B, for example, the motor current has no effect on the DC line current. Thus, the filter 2 formed by the inductor L and the capacitors C1 and C2 is provided primarily for the period during which the motor M is in the OFF state. During this time period, the filter 2 formed by the inductor L and the capacitors C1, C2 provides a soft impedance for the DC line. Thus, when the motor M is connected to the DC line via the switch SW1, the buck converter 1 essentially includes two LC filters, the filter 2 formed by the inductor L and the capacitors C1, C2 and a second filter formed by the inductance LM and capacitance CM of the motor M. Thus, in the ON state, the circuit has two filters in series. In the OFF state, the motor M is disconnected, and thus, the filter effect thereof is lost.

Figure 3A:
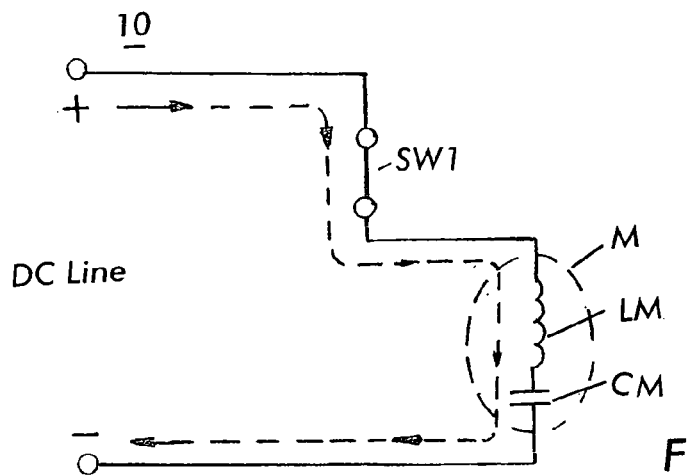
FIG. 3A is an illustration of a buck converter in accordance with an embodiment of the present invention with the motor in an ON state.
Figure 3B:
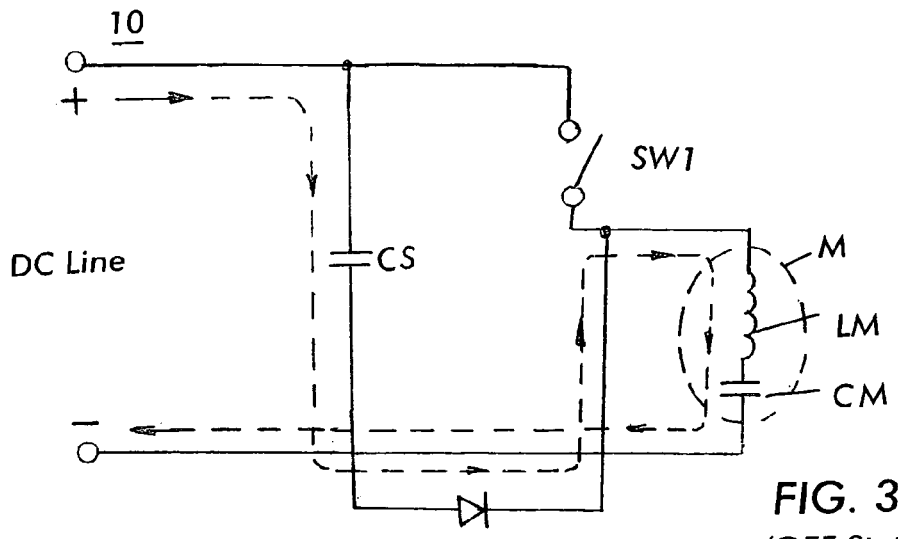
FIG. 3B is an illustration of a buck converter in accordance with an embodiment of the present invention with the motor in an OFF state.

A buck converter 10 in accordance with an embodiment of the present invention is represented in simplified form in FIGS. 3A and 3B. In FIG. 3A, the motor M is represented by the inductor LM and the capacitance CM as in FIGS. 2A and 2B. The motor M is connected to the DC line via the closed switch SW1 in FIG. 3A, and is thus in the ON state. In FIG. 3B, a modification of the circuit is illustrated. A voltage shifting capacitor CS is provided across the switch SW1 such that when the switch SW1 is open, the filtering effect of the inductance LM and the capacitance CM of the motor M may still be used to smooth the DC line current. As illustrated, the capacitor CS is connected in series with a diode D1 across the switch SW1. As a result, the filtering effect of the motor M is effective to smooth the DC line current since current still flows through the motor, as is illustrated by the arrows in FIG. 3B. The capacitor CS is no longer a part of an input LC filter, but instead acts as a voltage shifter that closes the motor path through the DC line while the motor is in the OFF state.

In a preferred embodiment, the voltage across capacitor CS is controlled such that it remains slightly higher than the DC bus. The demagnetization current uses the DC line to provide a continuous low ripple DC line current with pulses. The value of the capacitor CS is approximately 1/100 of the value of the capacitors used in a conventional input filter such as the filter 2 mentioned above, with equivalent EMI performance at the same operating frequency and eliminates the need to provide an additional inductor. The voltage across CS will tend to increase as a result of pulse width modulation (PWM) cycles which are commonly a factor since the switch SW1 is often pulse width modulated. Thus, it is desirable to provide an active device 27 (see FIG. 4) to discharge and control the voltage across the capacitor CS.

Figure 4:
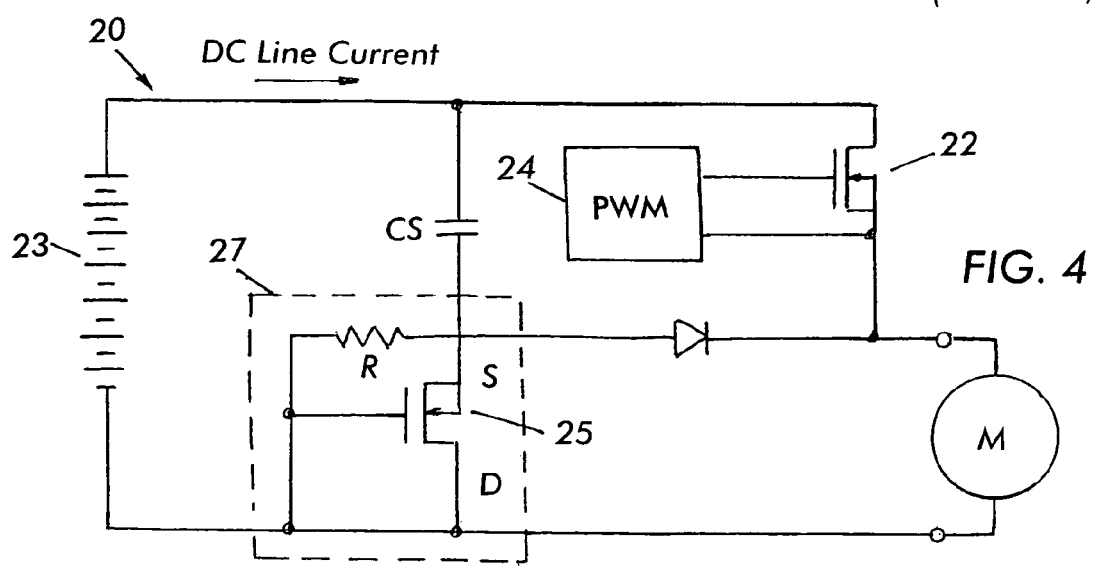
FIG. 4 is an illustration of a buck converter in accordance with another embodiment of the present invention.

FIG. 4 illustrates a buck converter 20 in accordance with an embodiment of the present invention. As illustrated in FIG. 4, a switch 22, which may be similar in function to switch SW1 discussed above, is provided to connect the motor M to DC power source 23. In this case, the DC power source 23 is represented as a battery, however, any suitable DC power source may be used. In particular, the switch 22 is illustrated as a MOSFET, however, any suitable switchable device may be used. The switch 22 is pulse width modulated based on a pulse width modulation signal from the PWM controller 24 which is connected to the gate of the MOSFET in FIG. 4. The capacitor CS is preferably discharged via an active device 27, preferably in the form of the low Vt N MOSFET 25 of FIG. 4. That is, the MOSFET 25 controls the voltage across voltage shifting capacitor CS to provide optimal power dissipation and/or bus current ripple current. The use of this active device 27 also allows adjustment of the demagnetization by controlling the capacitor voltage. Use of the such an active device allows for other applications as well, for example, sensor-less Back EMF speed control, for example.

Figure 5:
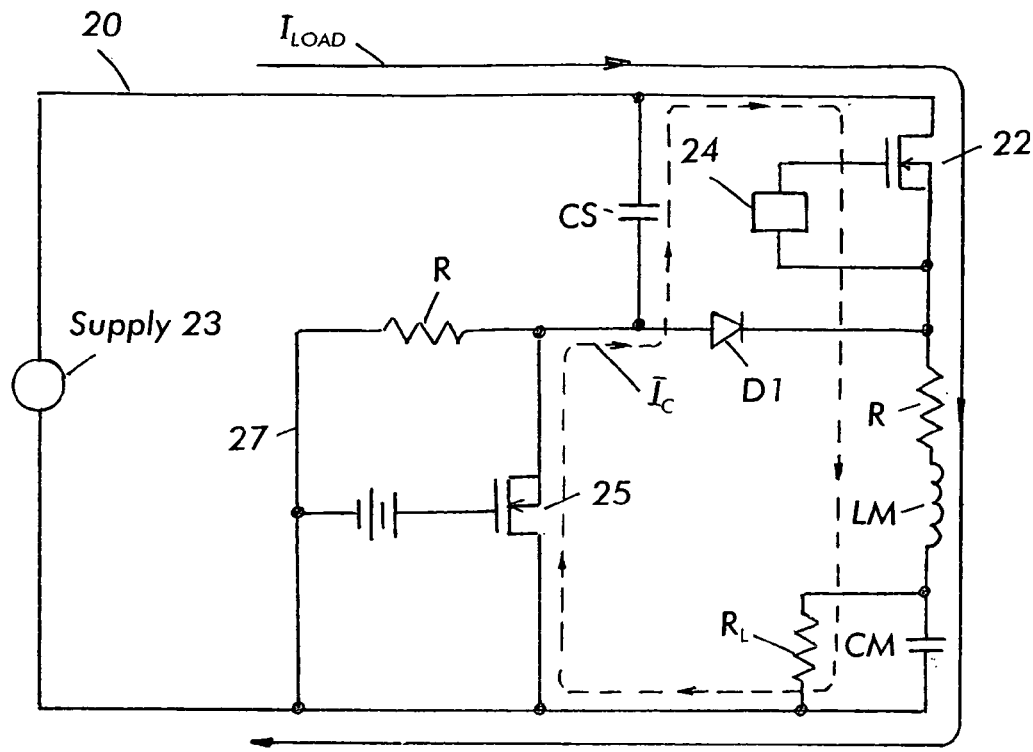
FIG. 5 is an illustration of a simulated circuit representing the circuit of FIG. 4 in an ON state.
Figure 5A:
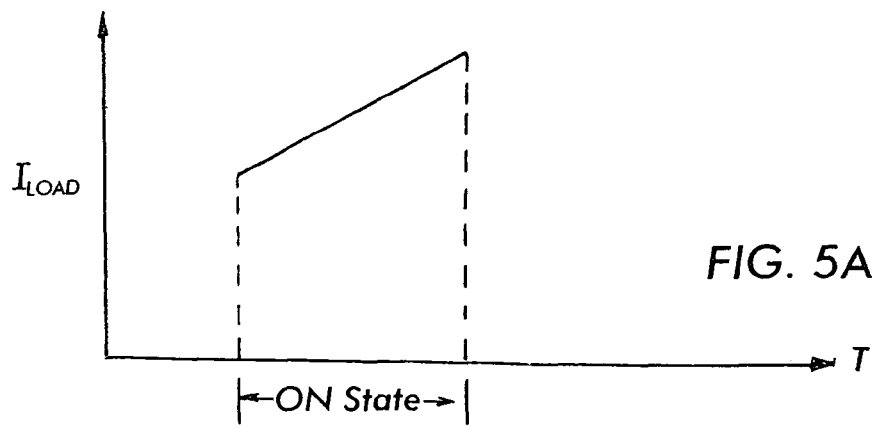
FIG. 5A is a graph illustrating load current in the circuit of FIG. 5 relative to time.
Figure 5B:
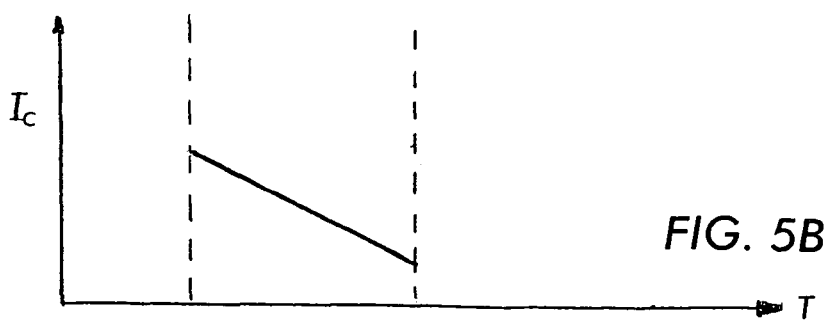
FIG. 5B is a graph illustrating capacitor current in the circuit of FIG. 5 relative to time.

FIG. 5 illustrates a simulated circuit used to simulate the circuit of FIG. 4 and common reference symbols refer to common elements. In FIG. 5, the dotted line indicates the capacitor current (Ic), that is, the current through the capacitor CS, while the solid line indicates the load current, (Iload) through the load, such as the motor M. The load in the simulated circuit is represented by an inductance LM and capacitance CM and a load resistance $R_L$. These parameters represent the motor M, for example, from FIG. 4. In FIG. 5, the load is in the ON state for purposes of the simulation. FIG. 5B is a graph illustrating the respective values for the currents Ic and Iload during the ON state.

Figure 6:
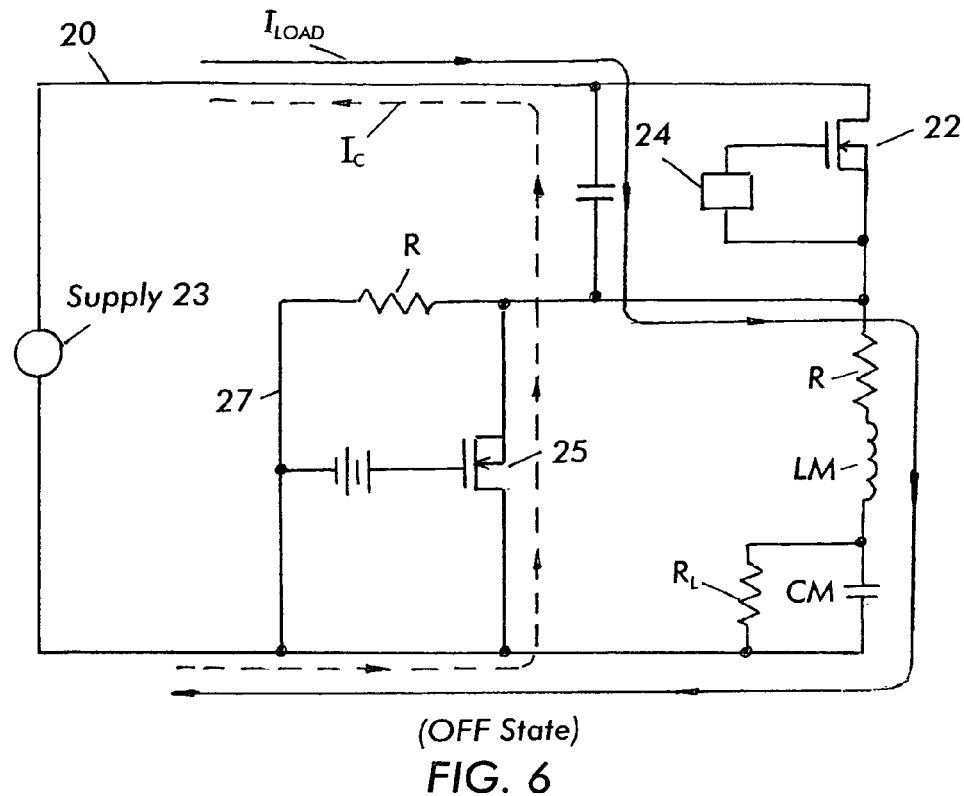
FIG. 6 is an illustration of a simulated circuit representing the circuit of FIG. 4 in an OFF state.
Figure 6A:
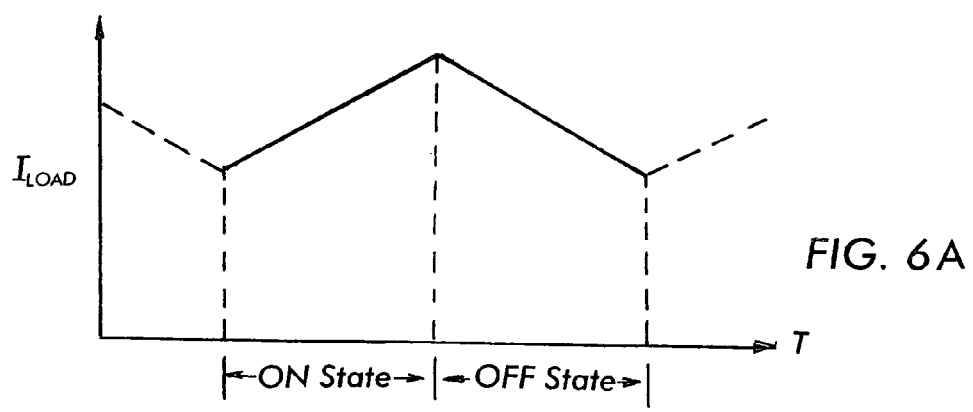
FIG. 6A is a graph illustrating load current in the circuit of FIG. 6 relative to time.
Figure 6B:
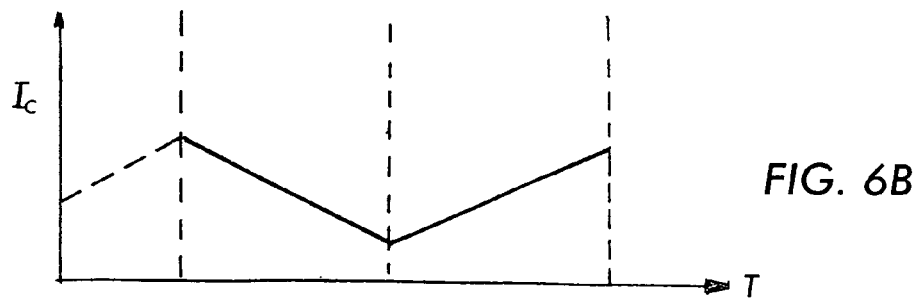
FIG. 6B is a graph illustrating capacitor current in the circuit of FIG. 6 relative to time.

FIG. 6, on the other hand, illustrates a simulated circuit similar to that of FIG. 5, except that the dashed line and solid lines represent the currents Ic and Iload, respectively, when the load is in the OFF state. The graph of FIG. 6B illustrates the currents Ic and Iload in both the ON and OFF states. As can be seen, the ripple of both currents is minimal, which provides good EMI characteristics.

Figure 7:
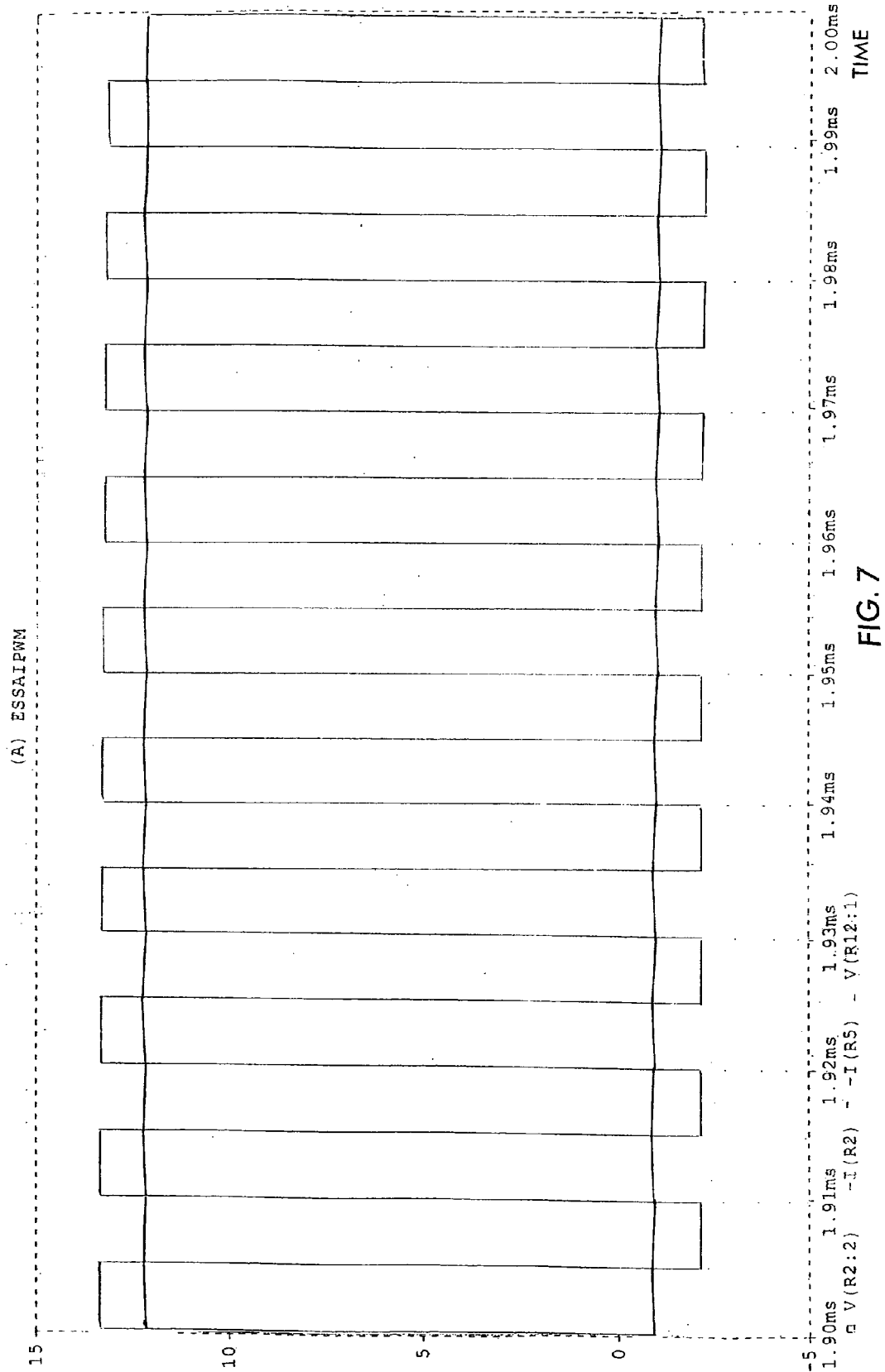
FIG. 7 is a graph illustrating the waveform of the DC line current.
Figure 8:
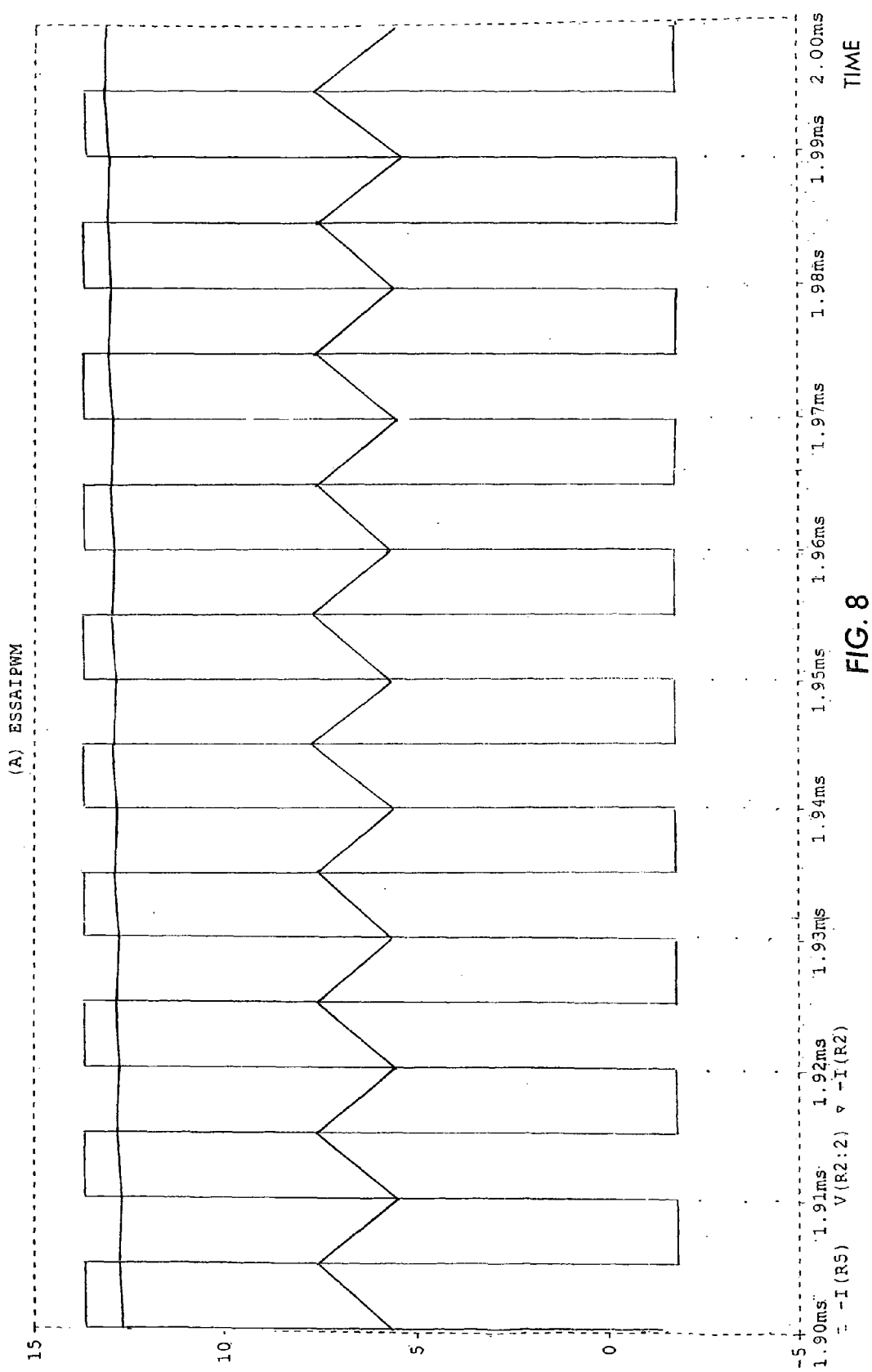
FIG. 8 is a graph illustrating simulation results of the circuit of FIGS. 5-6.
Figure 9:
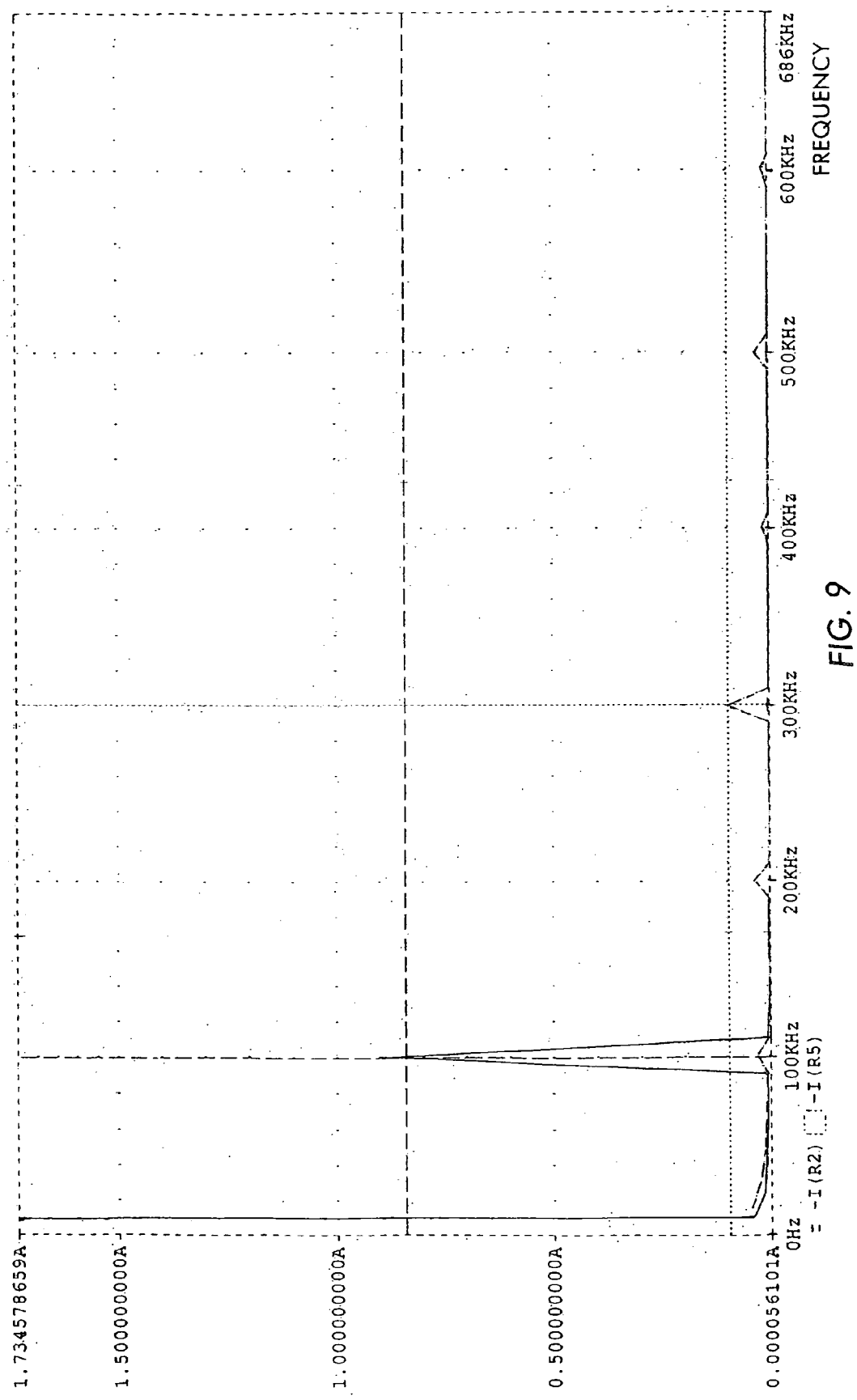
FIG. 9 is another graph illustrating simulation results of the circuit of FIGS. 5-6.

FIGS. 7-9 are graphs illustrating the results of simulation on the simulated circuits of FIGS. 5-6. As can be seen in FIG. 7, the DC line current remains substantially continuous as is desired. Further, as is illustrated in FIGS. 8-9 the other characteristics of the simulated circuits are also favorable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A buck converter for use in controlling a motor, the buck converter comprising:
    a power input operable for connection to a DC power supply;
    a switch for selectively connecting the motor to the power supply;
    a pulse width modulation controller operable to provide a pulse width modulation signal to the switch, wherein the switch connects the motor to the power supply based on the pulse width modulation signal;
    a voltage shifting capacitor connected with an anode of a diode; and
    another switch directly connecting said anode of said diode to aground terminal of said DC power supply;
    wherein said voltage shifting capacitor and said diode are connected, in series, across said switch, and said diode is connected to said motor only at its cathode.

2. The buck converter of claim 1, wherein said another switch comprises a shift control device operable to control a voltage across the voltage shifting capacitor.

3. The buck converter of claim 2, wherein the switch is a power MOSFET and the pulse width modulation signal is provided to a gate of the power MOSFET to turn the MOSFET on to connect the motor to the DC power source when desired.

4. The buck converter of claim 3, wherein the DC power supply is a battery.

5. The buck converter of claim 4, wherein the voltage shifting capacitor and the diode are connected across the switch such that current flows through the motor when the motor is not connected to the power supply by the switch.

6. The buck converter of claim 5, wherein the shift control device controls a rate of discharge of the voltage shifting capacitor.

7. The buck converter of claim 6, wherein the shift control device is an n-type MOSFET with a low threshold voltage.

8. A buck converter for use in controlling a motor, the buck converter comprising:

a power input operable for connection to a DC power supply;

a switch for selectively connecting the motor to the power supply;

a pulse width modulation control operable to provide a pulse width modulation signal to the switch, wherein the switch connects the motor to the power supply based on the pulse width modulation signal;

a voltage shifting capacitor connected with an anode of a diode, said voltage shifting capacitor and said diode connected, in series, across said switch, and said diode connected to said motor only at its cathode; and another switch directly connecting said anode of said diode to a ground terminal of said DC power supply;

wherein the voltage shifting capacitor acts as a voltage shifter that closes the motor path through a direct current ("DC") line while the motor is in an OFF state.

9. The buck converter of claim 8, wherein said another switch comprises a shift control device operable to control a voltage across the voltage shifting capacitor to improve filtering.

10. The buck converter of claim 9, wherein the switch is a power MOSFET and the pulse width modulation signal is provided to a gate of the power MOSFET to turn the MOSFET on to connect the motor to the DC power source when desired.

11. The buck converter of claim 10, wherein the DC power supply is a battery.

12. The buck converter of claim 11, wherein the voltage shifting capacitor and the diode are connected across the switch such that current flows through the motor when the motor is not connected to the power supply by the switch.

13. The buck converter of claim 12, wherein the shift control device controls a rate of discharge of the voltage shifting capacitor.

14. The buck converter of claim 13, wherein the shift control device is an n-type MOSFET with a low threshold voltage.

15. A buck converter for use in controlling a motor, the buck converter comprising:

a power input operable for connection to a DC power supply;

a switch for selectively connecting the motor to the power supply;

a pulse width modulation control operable to provide a pulse width modulation signal to the switch, wherein the switch connects the motor to the power supply based on the pulse width modulation signal;

a voltage shifting capacitor connected with an anode of a diode such that said voltage shifting capacitor and said diode are connected, in series, across said switch, and said diode is connected to said motor only at its cathode; and another switch directly connecting said anode of said diode to a ground terminal of said DC power supply;

wherein current flows through the motor when the motor is not connected to the power supply by the switch.

16. The buck converter of claim 15, wherein said another switch comprises a shift control device operable to control a voltage across the voltage shifting capacitor.

17. The buck converter of claim 16, wherein the switch is a power MOSFET and the pulse width modulation signal is provided to a gate of the power MOSFET to turn the MOSFET on to connect the motor to the DC power source when desired.

18. The buck converter of claim 17, wherein the DC power supply is a battery.

19. The buck converter of claim 18, wherein the shift control device controls a rate of discharge of the voltage shifting capacitor.

20. The buck converter of claim 19, wherein the shift control device is an n-type MOSFET with a low threshold voltage.

* * * * *